W. E. WILLIAMS.
METAL DISK WHEEL.
APPLICATION FILED AUG. 4, 1921.
1,427,927.
Patented Sept. 5, 1922.
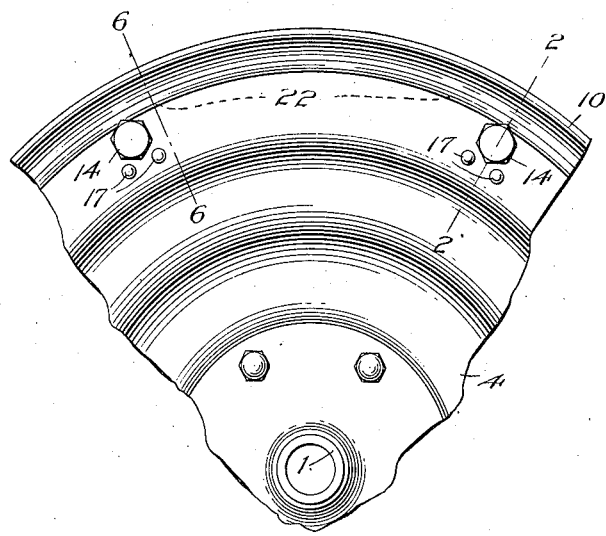
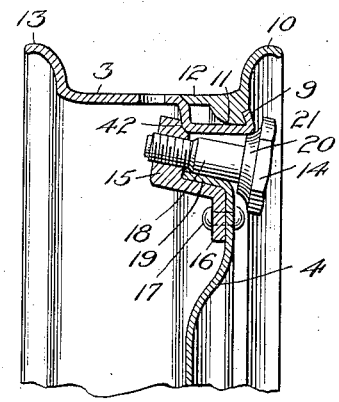
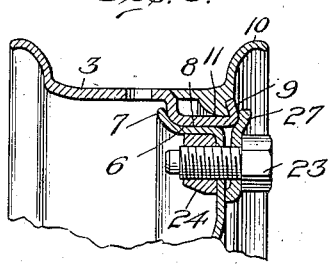
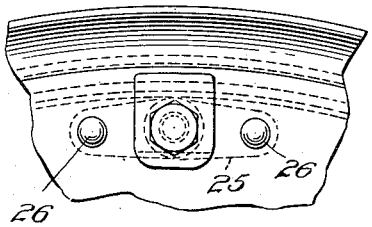
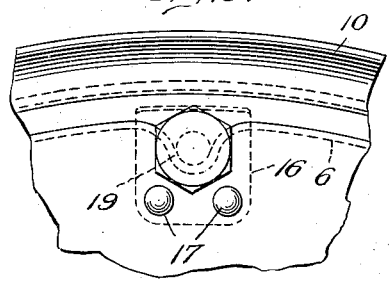
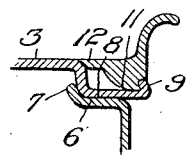
Inventor
William E. Williams,
By
Attorneys Patented Sept. 5, 1922.

1,427,927

UNITED STATES PATENT OFFICE.

WILLIAM ERASTUS WILLIAMS, OF CHICAGO, ILLINOIS.

METAL DISK WHEEL.

Application filed August 4, 1921. Serial No. 489,780.

*To all whom it may concern:*

Be it known that I, WILLIAM E. WILLIAMS, a citizen of the United States, and resident of Chicago, in the county of Cook and State of Illinois, have invented certain new and useful Improvement in Metal Disk Wheels, of which the following is a specification, reference being had therein to the accompanying drawing.

This invention relates to metal disk wheels adapted for use with rubber tires and especially to such types as have demountable rims.

In the accompanying drawings:

Figure 1 is a side view of a diametrical segment of a wheel.

Fig. 2 is an enlarged section on the diametrical line 2—2.

Fig. 3 is a radial section of a rim having a modified fastening.

Fig. 4 is a side view of parts shown in Fig. 3.

Fig. 5 is an enlarged side view better showing a rim fastening seen in Fig. 1.

Fig. 6 shows a portion of the rim in section on the line 6—6, Fig. 1.

In these views, 1 represents the hub of a wheel, 4 a wheel disk and 3 the body of a demountable rim mounted on a seat 6, formed by pressing the marginal portion of the disk inward, with respect to the plane of the wheel, having a marginal inclined flange 7 projecting outward with respect to the wheel's axis, and supporting nearly the entire wheel load, which is transmitted through an annular inwardly offset portion 8 of the rim body 3, this portion 8 having a marginal hooked retaining flange 9 interlocking with a projection 11 of a tire-retaining side ring 10 and holding the latter in place. This side ring is of the well known divided type adapted to be sprung into and out of place, and it has a portion 12 forming an extension of the tire seat of the rim body 3, which has on its opposite side an integral tire retaining flange 13. The main demountable rim member is held in place on the seat 6 of the disk by inclined screws 14 engaging nuts 15, having flanges 16 secured to the disk by rivets 17, and provided with shoulders 42 which bear against the inwardly offset portion of the rim as do the flanges 7 of the disk portion 6. The bodies or shanks 18 of the screws 14 lie close to the rim in depressions 19 formed in the part 6, and adjacent to the heads have curved seats or shoulders 20 which fit closely against the base of the flange 9 of the rim offset 8. Owing to the relatively inclined position of the screws, when tightened they press the rim 3 against the flange 7 and at the same time tend to expand the rim and create tension in the several spaces, between the screws, indicated by a dotted line 22, Fig. 1.

When the screws are withdrawn this tension ceases and the rim and disk are readily separated.

Figs. 3 and 4 show, in place of the screws 14, non-inclined screws 23 engaging nuts 24 having flanges 25 fixed to the disk by rivets 26. Each of these screws presses a clip block 27 against the main rim and pushes it inwardly on its disk seat 6.

What I claim is:—

1. The combination with a wheel disk having a marginal rim seat with an inclined flange at its inner side extending outwardly with respect to the wheel's center, of a rim fitting said seat and inclined flange, and screws having inclined shoulders at intervals arranged to press the rim inward against said flange and at the same time press its outer margin radially outward.

2. The combination with a disk having its annular marginal portion pressed laterally out of its general plane to form a seat for a demountable rim, of a series of inclined screws arranged at intervals around the wheel to press the rim outward and draw its intermediate portions against said seat.

3. The combination with a wheel disk having an annular approximately cylindrical rim seat provided with transverse depressions at intervals, of a rim upon said seat, and screws in said depressions, respectively, and arranged to press the rim radially outward while by reaction pulling the cylindrical rim seat edgewise; whereby the portions of the rim between the screws grip the seat under tension produced by the screws and release it when the screws are loosened.

4. The combination with a wheel disk and a wheel rim seated thereon, of an annular series of inclined screws engaging and reacting against the disk, and having an inclined shoulder 20 arranged to thrust the rim radially outward while drawing it inwardly with respect to the plane of the wheel.

5. The combination with a wheel disk having a lateral approximately cylindrical rim seat, of a demountable rim mounted upon said rim seat, and a series of inclined screws with curved shoulders at their heads, reacting upon the disk and acting to press the rim inward upon its seat and radially outward.

6. The combination with a wheel disk having its outer marginal portion turned over laterally to form a slightly conical rim-seat and provided with a series of nuts fixed adjacent to said seat and themselves having marginal seats to share with the conical rim seat the pressure of a rim, a demountable rim mounted on said seats, and screws engaging the nuts, respectively, and pressing the rim firmly against the conical rim seat and the nut seats.

In testimony whereof I hereunto affix my signature.

WILLIAM ERASTUS WILLIAMS.